(12) United States Patent
Yamamoto et al.

(10) Patent No.: US 10,940,668 B2
(45) Date of Patent: Mar. 9, 2021

(54) FUNCTIONAL LAYER INCLUDING LAYERED DOUBLE HYDROXIDE, AND COMPOSITE MATERIAL

(71) Applicant: NGK INSULATORS, LTD., Nagoya (JP)

(72) Inventors: Sho Yamamoto, Nagoya (JP); Shohei Yokoyama, Nagoya (JP); Naoko Inukai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 26 days.

(21) Appl. No.: 16/227,545

(22) Filed: Dec. 20, 2018

(65) Prior Publication Data
US 2019/0126588 A1 May 2, 2019

Related U.S. Application Data

(63) Continuation of application No. PCT/JP2017/022905, filed on Jun. 21, 2017.

(30) Foreign Application Priority Data

Jun. 24, 2016 (JP) .............................. JP2016-125531
Jun. 24, 2016 (JP) .............................. JP2016-125554
(Continued)

(51) Int. Cl.
*B32B 5/18* (2006.01)
*B32B 9/00* (2006.01)
(Continued)

(52) U.S. Cl.
CPC .................. *B32B 5/18* (2013.01); *B32B 9/00* (2013.01); *B32B 9/005* (2013.01); *C01F 7/00* (2013.01);
(Continued)

(58) Field of Classification Search
CPC .. H01M 10/0562; H01M 10/26; H01M 10/36; H01M 2/145; H01M 2/1646; H01M 2/1686; H01M 4/244; H01M 4/32
See application file for complete search history.

(56) References Cited

U.S. PATENT DOCUMENTS 6,706,442 B1   3/2004 Sakamoto et al.
7,896,949 B2 *  3/2011 Ku ....................... B01D 53/228
                                                  427/244

(Continued)

FOREIGN PATENT DOCUMENTS

CN        1322381 A      11/2001
EP     3 015 430 A1       5/2016
(Continued)

OTHER PUBLICATIONS

NiTi layered double hydroxide thin films for advanced pseudocapacitor electrodes; Yaohang Gu, Zhiyi Lu, Zheng Chang, Junfeng Liu, Xiaodong Lei, Yaping Li, and Xiaoming Sun; Journal of Materials Chemistry, Mar. 2013 (Year: 2013).*

(Continued)

*Primary Examiner* — Miriam Stagg
*Assistant Examiner* — Rachel L Zhang
(74) *Attorney, Agent, or Firm* — Burr & Brown, PLLC

(57) ABSTRACT

There is provided a functional layer including a layered double hydroxide. The functional layer further contains titania.

17 Claims, 6 Drawing Sheets

(30) Foreign Application Priority Data

| | | |
|---|---|---|
| Jun. 24, 2016 | (JP) | JP2016-125562 |
| Jan. 31, 2017 | (WO) | PCT/JP2017/003333 |
| Mar. 27, 2017 | (WO) | PCT/JP2017/012422 |
| Mar. 27, 2017 | (WO) | PCT/JP2017/012427 |
| Mar. 27, 2017 | (WO) | PCT/JP2017/012435 |

(51) Int. Cl.

| | |
|---|---|
| *C01F 7/00* | (2006.01) |
| *C01G 23/00* | (2006.01) |
| *C01G 53/00* | (2006.01) |
| *H01M 2/16* | (2006.01) |
| *C01F 7/02* | (2006.01) |
| *C01G 23/04* | (2006.01) |
| *C01G 53/04* | (2006.01) |
| *H01M 10/26* | (2006.01) |
| *H01M 2/14* | (2006.01) |
| *C01G 23/047* | (2006.01) |
| *H01M 4/24* | (2006.01) |
| *H01M 4/32* | (2006.01) |

(52) U.S. Cl.
CPC ............... *C01F 7/02* (2013.01); *C01G 23/00* (2013.01); *C01G 23/04* (2013.01); *C01G 23/047* (2013.01); *C01G 53/00* (2013.01); *C01G 53/006* (2013.01); *C01G 53/04* (2013.01); *H01M 2/145* (2013.01); *H01M 2/16* (2013.01); *H01M 2/1646* (2013.01); *H01M 2/1686* (2013.01); *H01M 4/244* (2013.01); *H01M 4/32* (2013.01); *H01M 10/26* (2013.01); *B32B 2305/026* (2013.01); *B32B 2457/10* (2013.01); *C01P 2002/22* (2013.01); *C01P 2002/74* (2013.01); *C01P 2004/03* (2013.01); *C01P 2006/16* (2013.01); *C01P 2006/40* (2013.01)

(56) References Cited

U.S. PATENT DOCUMENTS

| | | | |
|---|---|---|---|
| 2009/0142394 A1 | 6/2009 | Okada et al. | |
| 2014/0315099 A1 | 10/2014 | Yamada et al. | |
| 2015/0079298 A1 | 3/2015 | Ferreira et al. | |
| 2015/0238927 A1 | 8/2015 | O'Hare et al. | |
| 2015/0340680 A1 | 11/2015 | Fujisaki et al. | |
| 2015/0364790 A1 | 12/2015 | Yonehara et al. | |
| 2016/0141582 A1* | 5/2016 | Fujisaki | H01M 2/1646 429/144 |
| 2017/0077476 A1 | 3/2017 | Kitoh et al. | |
| 2017/0104241 A1 | 4/2017 | Hayashi et al. | |
| 2017/0194614 A1 | 7/2017 | Yokoyama et al. | |
| 2017/0200981 A1 | 7/2017 | Yokoyama et al. | |
| 2017/0260048 A1 | 9/2017 | Yamamoto et al. | |

FOREIGN PATENT DOCUMENTS

| | | |
|---|---|---|
| JP | 2001-302944 A1 | 10/2001 |
| JP | 2003-277646 A1 | 10/2003 |
| JP | 2005-089277 A1 | 4/2005 |
| JP | 2010-059005 A1 | 3/2010 |
| JP | 2010-235437 A1 | 10/2010 |
| JP | 2013-201056 A1 | 10/2013 |
| JP | 2014-123431 A1 | 7/2014 |
| JP | 2015-015229 A1 | 1/2015 |
| JP | 2015-095286 A1 | 5/2015 |
| JP | 2015-520018 A1 | 7/2015 |
| JP | 2015-535797 A1 | 12/2015 |
| JP | 2016-084263 A1 | 5/2016 |
| JP | 2016-084264 A1 | 5/2016 |
| JP | 2017-082191 A1 | 5/2017 |
| WO | 2008/075621 A1 | 6/2008 |
| WO | 2013/118561 A1 | 8/2013 |
| WO | 2015/098610 A1 | 7/2015 |
| WO | 2016/006348 A1 | 1/2016 |
| WO | 2016/051934 A1 | 4/2016 |
| WO | 2016/067885 A1 | 5/2016 |
| WO | 2016/076047 A1 | 5/2016 |
| WO | 2016/098513 A1 | 6/2016 |

OTHER PUBLICATIONS https://pubs.acs.org/doi/pdf/10.1021/ef101150b (Year: 2010).*
Extended European Search Report (Application No. 17815456.3) dated Jan. 20, 2020.
International Search Report and Written Opinion (Application No. PCT/JP2017/022905) dated Aug. 1, 2017 (with English translation).
International Search Report and Written Opinion (Application No. PCT/JP2017/003333) dated May 16, 2017 (with English translation).
International Search Report and Written Opinion (Application No. PCT/JP2017/012422) dated Jun. 6, 2017 (with English translation).
International Search Report and Written Opinion (Application No. PCT/JP2017/012427) dated Jun. 6, 2017 (with English translation).
International Search Report and Written Opinion (Application No. PCT/JP2017/012435) dated Jun. 13, 2017 (with English translation).
Chinese Office Action, Chinese Application No. 201780038255.9, dated Nov. 20, 2020 (8 pages).

* cited by examiner

FUNCTIONAL LAYER INCLUDING LAYERED DOUBLE HYDROXIDE, AND COMPOSITE MATERIAL

CROSS-REFERENCE TO RELATED APPLICATIONS

This application is a continuation application of PCT/JP2017/022905 filed Jun. 21, 2017, which claims priority to PCT/JP2017/012422 filed Mar. 27, 2017, PCT/JP2017/012427 filed Mar. 27, 2017, PCT/JP2017/012435 filed Mar. 27, 2017, PCT/JP2017/003333 filed Jan. 31, 2017, Japanese Patent Application No. 2016-125531 filed Jun. 24, 2016, Japanese Patent Application No. 2016-125554 filed Jun. 24, 2016, and Japanese Patent Application No. 2016-125562 filed Jun. 24, 2016, the entire contents all of which are incorporated herein by reference.

BACKGROUND OF THE INVENTION

1. Field of the Invention

The present invention relates to a functional layer including a layered double hydroxide, and a composite material.

2. Description of the Related Art

A layered double hydroxide (hereafter also referred to as LDH) is a material having an exchangeable anions and $H_2O$ as intermediate layers between stacked basic hydroxide layers, and is used as, for example, catalysts, adsorbents and dispersants in polymers for improving heat resistance to take its advantage.

The LDH has also been attractive as a material that conducts hydroxide ions; hence, addition of the LDH to an electrolyte of an alkaline fuel cell and a catalytic layer of a zinc air battery has been studied. In particular, the use of a LDH as a solid electrolyte separator for alkaline secondary batteries such as nickel-zinc secondary batteries and zinc-air secondary batteries has been recently proposed, and composite materials with a LDH containing functional layer suitable for such a separator application are known. For example, Patent Document 1 (WO2015/098610) discloses a composite material comprising a porous substrate and a LDH containing functional layer having no water permeability formed on and/or in the porous substrate. The LDH containing functional layer is represented by the general formula: $M^{2+}_{1-x}M^{3+}_x(OH)_2A^{n-}_{x/n} \cdot mH_2O$, wherein $M^{2+}$ is a divalent cation such as $Mg^{2+}$, $M^{3+}$ is a trivalent cation such as $Al^{3+}$, $A^{n-}$ is an n-valent anion such as $OH^-$, $CO_3^{2-}$, n is an integer of 1 or more, x is 0.1 to 0.4, and m is 0 or above 0. The LDH containing functional layer disclosed in Patent Document 1 is densified to such an extent that it has no water permeability. When the LDH is used as a separator, it can prevent deposition of dendritic zinc and penetration of carbon dioxide from an air electrode in zinc air batteries that are obstacles to practical use of alkaline zinc secondary batteries.

Unfortunately, high ionic hydroxide conductivity is required for electrolytic solutions of alkaline secondary batteries (for example, metal air batteries and nickel zinc batteries) including LDHs, and thus the use of strong alkaline aqueous potassium hydroxide solution at pH of about 14 is desired. For this purpose, it is desirable for LDH to have high alkaline resistance such that it is barely deteriorated even in such a strong alkaline electrolytic solution. In this regard, Patent Document 2 (WO2016/051934) discloses a LDH containing battery that contains a metallic compound containing a metallic element (for example, Al) corresponding to $M^{2+}$ and/or $M^{3+}$ in the general formula described above dissolved in the electrolytic solution to suppress erosion of the LDH.

CITATION LIST

Patent Documents

Patent Document 1: WO2015/098610
Patent Document 2: WO2016/051934

SUMMARY OF THE INVENTION

The present inventors have now found that durability to an alkaline electrolytic solution (that is, alkaline resistance) is improved by further addition of titania into a functional layer containing a LDH.

Accordingly, an object of the present invention is to provide a LDH containing functional layer having high alkaline resistance, and a composite material with the LDH containing functional layer.

One embodiment of the present invention provides a functional layer comprising a layered double hydroxide, wherein the functional layer further comprises titania.

Another embodiment of the present invention provides a composite material that comprises a porous substrate and a functional layer provided on the porous substrate and/or embedded in the porous substrate.

Another embodiment of the present invention provides a battery including the functional layer or the composite material as a separator.

DETAILED DESCRIPTION OF THE INVENTION

Figure 1:
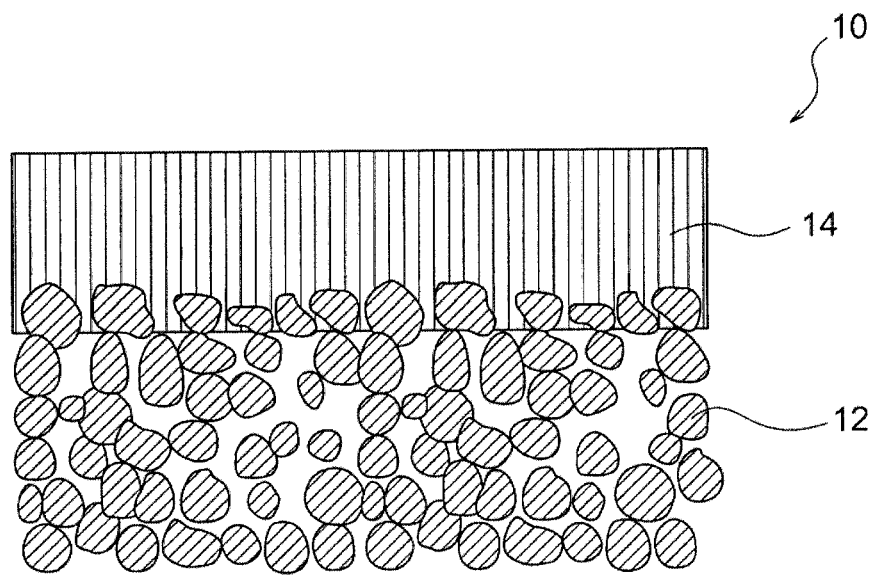
FIG. 1 is a schematic cross-sectional view illustrating a LDH containing composite material of one embodiment of the present invention.

LDH Containing Functional Layer and Composite Material

The functional layer of the present invention includes a layered double hydroxide (LDH). The functional layer further includes titania. As described above, high alkaline resistance that barely exhibits the deterioration even in a strong alkaline electrolytic solution is desired for the LDH in alkaline secondary batteries. According to the present invention, durability to an alkaline electrolytic solution (that is, alkaline resistance) in this regard can be improved by further addition of titania in the LDH containing functional layer. Meanwhile, the functional layer of the present invention can also exhibit high ionic conductivity suitable for the use as a separator for alkaline secondary batteries of LDH. The present invention can accordingly provide a LDH containing functional layer having not only high ionic conductivity but also high alkaline resistance.

The crystalline structure of titania in the functional layer of the present invention is preferably of anatase-type or rutile-type, which should not be construed as limiting. Titania is preferably contained in the functional layer in an amount capable of improving alkaline resistance without substantially impairing ionic conductivity of the functional layer, which should not be construed as limiting. The content of titania can be determined by an X-ray diffractometry. When the surface of the functional layer is measured by the X-ray diffractometry, the ratio of the peak intensity $I_{TiO2}$ derived from titania to the peak intensity $I_{LDH}$ derived from the (003) plane of the layered double hydroxide (that is, the ratio of $I_{TiO2}/I_{LDH}$) is preferably 0.1 or more, more preferably 0.1 to 10, further preferably 0.1 to 1.0. In the case that titania is of an anatase-type, $I_{TiO2}$ is the peak intensity derived from the (101) plane that is the strongest peak, the strongest peak being typically detected at $2\theta=24.5°$ to $26.5°$. In the case that titania is of a rutile-type, $I_{TiO2}$ is the peak intensity derived from the (110) plane that is the strongest peak, the strongest peak being typically detected at $2\theta=26.5°$ to $28.5°$. When the $I_{TiO2}/I_{LDH}$ of the functional layer is within the above ranges, the LDH containing functional layer has high ionic conductivity and high alkaline resistance.

The LDH contained in the functional layer of the present invention may have any composition. As is generally known, the LDH is composed of a plurality of basic hydroxide layers and intermediate layers interposed between these basic hydroxide layers. The basic hydroxide layers are each mainly composed of metallic elements (typically metallic ions) and OH groups. The intermediate layers of the LDH contained in the functional layer are composed of anions and $H_2O$. The anions are monovalent or multivalent anions, preferably monovalent or divalent ions. Preferably, the anions in the LDH include $OH^-$ and/or $CO_3^{2-}$. The LDH in the present invention preferably undergoes no changes of the surface microstructure and the crystalline structure during the alkaline resistance evaluation described above. The LDH has high ionic conductivity based on its inherent properties, as described above.

According to a preferred embodiment of the present invention, the basic hydroxide layers of LDH comprise Ni, Al, Ti and OH groups, or Ni, Al and OH groups. The intermediate layers of LDH are composed of anions and $H_2O$ as described above. Although the alternately stacked structure itself of basic hydroxide layers and intermediate layers is basically the same as the generally known alternately stacked structure of LDH, the basic hydroxide layers of LDH which is composed of certain elements or ions mainly having Ni, Al, OH groups and optional Ti can improve both ionic conductivity and alkaline resistance in the functional layer. In this case, Ni in the LDH can have the form of nickel ions. Although nickel ions in the LDH are typically believed to be $Ni^{2+}$, they may be present in any other valence, for example, $Ni^{3+}$. Al in the LDH can have the form of nickel ions. Although aluminum ions in the LDH are typically believed to be $Al^{3+}$, they may be present in any other valence. Ti in the LDH can have the form of titanium ions. Although titanium ions in the LDH are typically believed to be $Ti^{4+}$, they may be present in any other valence, for example, $Ti^{3+}$. The basic hydroxide layers may contain other elements or ions other than Ni, Al, Ti and OH groups. However, the basic hydroxide layers preferably contain Ni, Al, OH groups and optional Ti as main constituent elements. That is, it is preferred that the basic hydroxide layers are mainly composed of Ni, Al, OH groups and optional Ti. Accordingly, the basic hydroxide layers are typically composed of Ni, Al, OH groups and optional Ti and/or incidental impurities. For example, the basic hydroxide layers are composed of Ni, Al, Ti and OH groups or Ni, Al, Ti, OH groups and incidental impurities. Each of the incidental impurities is any element which may be inevitably mixed in a manufacturing process, and it may be mixed into the LDH from, for example, a raw material or a basic material. The intermediate layers of LDH contained in the functional layers are composed of anions and $H_2O$. The anions are monovalent or multivalent anions, preferably monovalent or divalent ions. Preferably, the anions in the LDH include $OH^-$ and/or $CO_3^{2-}$. As described above, it is impractical or impossible to strictly specify the LDH with a general formula since valences of Ni, Al and Ti are not necessarily confirmed. Assuming that the basic hydroxide layers are mainly composed of $Ni^{2+}$, $Al^{3+}$, $Ti^{4+}$ and OH groups, the basic composition of the corresponding LDH can be represented by the general formula: $Ni^{2+}_{1-x-y}Al^{3+}_x Ti^{4+}_y(OH)_2 A^{n-}_{(x+2y)/n} \cdot mH_2O$, wherein $A^{n-}$ is an n-valent anion, n is an integer of 1 or more, preferably 1 or 2, x is above 0 to below 1, preferably 0.01 to 0.5, y is above 0 to below 1, preferably 0.01 to 0.5, x+y is above 0 to below 1, and m is a real number of 0 or more, typically a real number of above 0 or 1 or more. However, it should be understood that the general formula indicates merely the "basic composition", and it may be replaced with other elements or ions (including elements with other valences of the same element, or elements or ions that may be unavoidably mixed in the manufacturing process) to such an extent that the elements such as $Ni^{2+}$, $Al^{3+}$ and $Ti^{4+}$ do not impair the basic properties of LDH.

The LDH contained in the functional layer preferably undergoes no changes in the surface microstructure and crystalline structure when immersed in a 6 mol/L aqueous potassium hydroxide solution containing zinc oxide in a concentration of 0.4 mol/L at 70° C. for three weeks or 504 hours because such an LDH has high alkaline resistance.

The presence of a change in the surface microstructure can be preferably determined by SEM (Scanning Electron Microscopy), and the presence of a change in the crystalline structure can be preferably determined by crystalline structural analysis (for example, the existence and non-existence of a shift in (003) peak derived from LDH by XRD (X-ray diffractometry).

Figure 2:
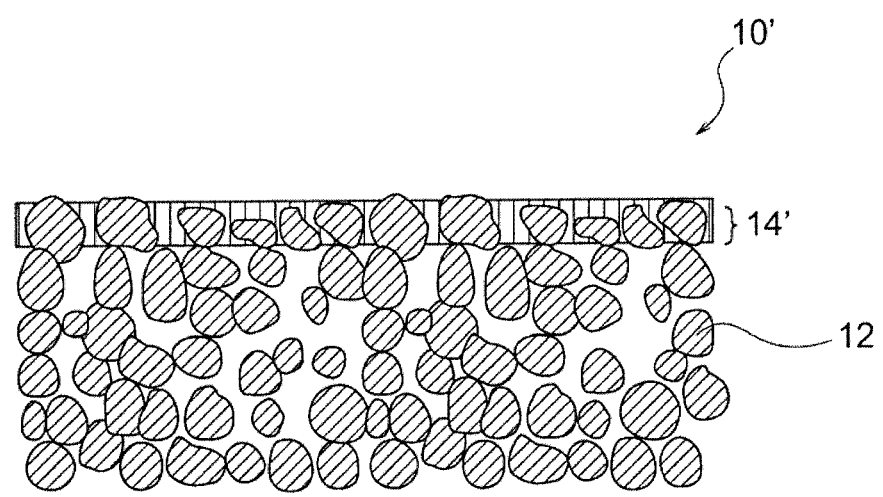
FIG. 2 is a schematic cross-sectional view illustrating a LDH containing composite material of one another embodiment of the present invention.

The functional layer (in particular, the LDH contained in the functional layer) has preferably ionic hydroxide conductivity. The functional layer has preferably an ionic conductivity of at least 0.1 mS/cm, more preferably at least 0.5 mS/cm, and most preferably at least 1.0 mS/cm. Higher ionic conductivity is preferred. The upper limit thereof is for example, 10 mS/cm, which should not be construed as limiting. Such high ionic conductivity is particularly suitable for battery application. For example, it is preferred to lower the resistance by thinning in order to put the LDH into practical use, and providing the LDH containing functional layers with desirably low resistance according to the embodiment is particularly advantageous in the application of LDH as a solid electrolyte separator for alkaline secondary batteries such as zinc air batteries or nickel zinc batteries Preferably, the functional layer is disposed on the porous substrate and/or embedded into the porous substrate. That is, a preferred embodiment of the present invention provides a composite material comprising a porous substrate and a functional layer disposed on the porous substrate and/or embedded into the porous substrate. For example, as in the composite material 10 shown in FIG. 1, a part of the functional layer 14 may be embedded in the porous substrate 12 and the remaining part may be disposed on the porous substrate 12. In this case, the portion of the functional layer 14 on the porous substrate 12 is a membrane portion made of a LDH membrane, and the portion of the functional layer 14 embedded into the porous substrate 12 is a composite portion composed of the porous substrate and the LDH. The composite portion is typically in the form in which the inside of the pores of the porous substrate 12 is filled with the LDH. Also, in the case where the entire functional layer 14' is embedded in the porous substrate 12 as the composite material 10' shown in FIG. 2, the functional layer 14' is mainly composed of the porous substrate 12 and the LDH. The composite material 10' and the functional layer 14' shown in FIG. 2 can be formed by removing the membrane portion (LDH membrane) of the functional layer 14 from the composite material 10 shown in FIG. 1 by a known method such as polishing or cutting. In FIGS. 1 and 2, the functional layers 14, 14' are embedded only in a part of the vicinity of the surface of the porous substrates 12, 12', but the functional layers may be embedded in any part of the porous substrate and over the entire part or the entire thickness of the porous substrate.

The porous substrate in the composite material of the present invention can preferably form the LDH containing functional layer thereon and/or therein. The substrate may be composed of any material and have any porous structure. Although It is typical to form the LDH containing functional layer on and/or in the porous substrate, the LDH containing functional layer may be formed on a non-porous substrate and then the non-porous substrate may be modified into a porous form by any known method. In any case, the porous substrate has advantageously a porous structure having good water permeability and it can deliver electrolytic solution to the functional layer when incorporated into a battery as a separator for the battery.

The porous substrate is composed of, preferably, at least one selected from the group consisting of ceramic materials, metallic materials, and polymeric materials, more preferably, at least one selected from the group consisting of ceramic materials and polymeric materials. More preferably, the porous substrate is composed of ceramic materials. In this case, preferred examples of the ceramic material include alumina, zirconia, titania, magnesia, spinel, calcia, cordierite, zeolite, mullite, ferrite, zinc oxide, silicon carbide, and any combination thereof. More preferred examples include alumina, zirconia, titania, and any combination thereof. Particularly preferred examples include alumina, zirconia (for example, yttria-stabilized zirconia (YSZ)), and combination thereof. Using these porous ceramics, a LDH containing functional layer with high density can be readily formed. Preferred examples of the metallic material include aluminum, zinc, and nickel. Preferred examples of the polymeric material include polystyrene, polyethersulfone, polypropylene, epoxy resin, poly(phenylene sulfide), hydrophilized fluororesin (such as tetrafluoro resin: PTFE), cellulose, nylon, polyethylene and any combination thereof. All these preferred materials have high resistance to the alkaline electrolytic solution of the battery.

Further preferably, the porous substrate is composed of the polymeric material. The polymeric porous substrate has the following advantageous properties; (1) high flexibility (hard to crack even if thinned), (2) high porosity, (3) high conductivity (thin thickness with high porosity), and (4) good manufacturability and handling ability. Further preferred polymeric materials are polyolefins such as, for example, polypropylene, polyethylene, and most preferably polypropylene from the viewpoint of high resistance to hot water, high acid resistance and high alkaline resistance, as well as low cost. When the porous substrate is composed of the polymeric material, it is more preferred that the functional layer is embedded into the entire porous substrate over the thickness (for example, most or substantially all of the pores inside the porous substrate are filled with the LDH). The preferred thickness of the polymeric porous substrate in this case is 5 to 200 μm, more preferably 5 to 100 μm, most preferably 5 to 30 μm. Usable polymer porous substrates are microporous membranes commercially available as separators for lithium batteries.

The porous substrate has preferably a mean pore diameter of at most 100 μm, more preferably at most 50 μm, for example, typically 0.001 to 1.5 μm, more typically 0.001 to 1.25 μm, further more typically 0.001 to 1.0 μm, particularly typically 0.001 to 0.75 μm, most typically 0.001 to 0.5 μm. Within these ranges, a dense LDH containing functional layer having no water permeability can be formed while keeping desirable water permeability and strength as a support for the porous substrate without the functional layer. In the present invention, the mean pore size can be determined by measuring the largest dimension of each pore based on the electron microscopic image of the surface of the porous substrate. The electron microscopic image is measured at 20,000-fold magnification or more. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. In the measurement, a dimension measuring function in software of SEM or image analyzing software (for example, Photoshop manufactured by Adobe) can be used.

The porous substrate has a porosity of preferably 10 to 60%, more preferably 15 to 55%, most preferably 20 to 50%. Within these ranges, the resulting dense LDH containing functional layer has no water permeability while the porous substrate keeps desirable water permeability and required strength as a support. The porosity of the porous substrate can be preferably measured by Archimedes' method. In the case where the porous substrate is composed of the polymeric material and the functional layer is embedded over the region of the porous substrate in the thickness direction, the porosity of the porous substrate is preferably 30 to 60%, more preferably 40 to 60%.

The functional layer preferably has no air permeability. That is, it is preferred that the functional layer be densified with the LDH to such an extent that it has no air permeability. In the present specification, the phrase "having no air permeability" has the following meaning: In the case of evaluation of air permeability by the "density determination test" adopted in the examples described later or a similar method, no bubbling of helium gas is observed at one side of the measured object, i.e., the functional layer and/or the porous substrate even if helium gas is brought into contact with the other side in water at a differential pressure of 0.5 atm across the thickness. By this densification, the functional layer or the composite material as a whole selectively allows only the hydroxide ion due to its ionic hydroxide conductivity to pass through, and can function as separators for batteries. In the case of the application of LDH as solid electrolyte separators for batteries, although the bulk LDH dense body has high resistance, the LDH containing functional layer in a preferred embodiment of the present invention can be thinned to reduce the resistance because the porous substrate has high strength. In addition, the porous substrate can have high water permeability and air permeability; hence, the electrolyte can reach the LDH containing functional layer when used as solid electrolyte separators of batteries. In summary, the LDH containing functional layer and the composite material of the present invention are very useful materials for solid electrolyte separators applicable to various batteries, such as metal air batteries (for example, zinc air batteries) and various other zinc secondary batteries (for example, nickel zinc batteries).

In the functional layer or the composite material including the functional layer, a helium permeability per unit area is preferably 10 cm/min·atm or less, more preferably 5.0 cm/min·atm or less, most preferably 1.0 cm/min·atm or less. The functional layer having such a range of helium permeability has extremely high density. When the functional layer having a helium permeability of 10 cm/min·atm or less is applied as a separator in an alkaline secondary battery, passage of substances other than hydroxide ions can be effectively prevented. For example, zinc secondary batteries can significantly effectively suppress penetration of Zn in the electrolytic solution. Since penetration of Zn is remarkably suppressed in this way, it can be believed in principle that deposition of dendritic zinc can be effectively suppressed in zinc secondary batteries. The helium permeability is measured through supplying helium gas to one surface of the functional layer to allow helium gas to pass through the functional layer and calculating the helium permeability to evaluate density of the functional layer. The helium permeability is calculated from the expression of $F/(P \times S)$ where $F$ is the volume of permeated helium gas per unit time, $P$ is the differential pressure applied to the functional layer when helium gas permeates through, and $S$ is the area of the membrane through which helium gas permeates. Evaluation of the permeability of helium gas in this manner can extremely precisely determine the density. As a result, a high degree of density that does not permeate as much as possible (or permeate only a trace amount) substances other than hydroxide ions (in particular, zinc that causes deposition of dendritic zinc) can be effectively evaluated. Helium gas is suitable for this evaluation because the helium gas has the smallest constitutional unit among various atoms or molecules which can constitute the gas and its reactivity is extremely low. That is, helium does not form a molecule, and helium gas is present in the atomic form. In this respect, since hydrogen gas is present in the molecular form ($H_2$), atomic helium is smaller than molecular $H_2$ in a gaseous state. Basically, $H_2$ gas is combustible and dangerous. By using the helium gas permeability defined by the above expression as an index, the density can be precisely and readily evaluated regardless of differences in sample size and measurement condition. Thus, whether the functional layer has sufficiently high density suitable for separators of zinc secondary batteries can be evaluated readily, safely and effectively. The helium permeability can be preferably measured in accordance with the procedure shown in Evaluation A5 in Examples described later.

The functional layer has preferably a thickness of 100 μm or less, more preferably 75 μm or less, further preferably 50 μm or less, particularly preferably 25 μm or less, most preferably 5 μm or less. Such thinning can reduce the resistance of the functional layer. In the case where the functional layer is formed as the LDH membrane on the porous substrate, the thickness of the functional layer corresponds to the thickness of the membrane portion composed of the LDH membrane. In the case where the functional layer is formed to be embedded into the porous substrate, the thickness of the functional layer corresponds to the thickness of the composite portion composed of the porous substrate and the LDH. In the case where the functional layer is formed on and in the porous substrate, the thickness of the functional layer corresponds to the total thickness of the membrane portion (the LDH membrane) and the composite portion (the porous substrate and the LDH). In any case, the above thickness leads to a low resistance suitable for practical use in, for example, battery application. Although the lower limit of the thickness of the LDH membrane is not limited because it depends on the application, the thickness is preferably 1 μm or more, more preferably 2 μm or more in order to assure a certain degree of rigidity suitable for a functional membrane such as a separator.

The LDH/titania-containing functional layer and the composite material can be produced by any method. They can be produced by appropriately modifying conditions of a known method for producing LDH containing functional layers and composite materials (see, for example, PLT 1 and 2). For example, the LDH containing functional layer and the composite material can be produced by (1) providing a porous substrate, (2) applying a mixed sol of alumina and titania onto the porous substrate and then heating the sol to form an alumina/titania layer, (3) immersing the porous substrate into an aqueous raw material solution containing nickel ions ($Ni^{2+}$) and urea, and (4) hydrothermally treating the porous substrate in the aqueous raw material solution to form the LDH containing functional layer on the porous substrate and/or in the porous substrate. The mixed sol is preferably produced by adding titanium oxide sol into amorphous alumina sol. In particular, in Step (2), forming the alumina/titania layer on the porous substrate can not only produce a raw material for the LDH, but also serve as a seed of LDH crystalline growth and uniformly form the LDH containing functional layer that is highly densified on the surface of the porous substrate. In addition, in Step (3), the presence of urea raises the pH value through generation of ammonia in the solution through the hydrolysis of urea, and gives the LDH by formation of hydroxide with coexisting metal ions. Also, generation of carbon dioxide in hydrolysis gives the LDH of a carbonate anion type.

In particular, a composite material in which the porous substrate is composed of a polymeric material and the functional layer is embedded over the porous substrate in the thickness direction is produced by applying the mixed sol of alumina and titania to the substrate in Step (2) in such that the mixed sol permeates into all or most area of the interior pores of the substrate. By this manner, most or substantially all pores inside the porous substrate can be embedded with the LDH. Examples of preferred application include dip coating and filtration coating. Particularly preferred is dip coating. The amount of the deposited mixed sol can be varied by adjusting the number of times of coating such as dip coating. The substrate coated with the mixed sol by, for example, dip coating may be dried and then subjected to Steps (3) and (4).

EXAMPLES

The present invention will be described in more detail by the following examples. The functional layers and the composite materials produced in the following examples were evaluated as follows:

Evaluation 1: Identification of Functional Layer

The crystalline phase of the functional layer was measured with an X-ray diffractometer (RINT TTR III manufactured by Rigaku Corporation) at a voltage of 50 kV, a current of 300 mA, and a measuring range of 10° to 70° to give an XRD profile. The resultant XRD profile was identified with the diffraction peaks of LDH (hydrotalcite compound) described in JCPDS card NO. 35-0964 and the diffraction peaks of $TiO_2$ described in JCPDS card NO. 01-071-1169. The ratio of $I_{TiO2}/I_{LDH}$, that is the ratio of the peak intensity $I_{TiO2}$ derived from titania to the peak intensity $I_{LDH}$ derived from the (003) plane of LDH (detected around $2\theta=11.42°$), was calculated. In this case, the peak intensity derived from the (101) plane, which is the strongest peak of anatase titania (detected around $2\theta=25.16°$), was employed as $I_{TiO2}$.

Evaluation 2: Identification of Titania

A BF-STEM image of the functional layer was taken with a scanning transmission electron microscope (STEM) (a brand name: JEM-ARM200 F, manufactured by JEOL). The BF-STEM image was subjected to Fast Fourier Transform (FFT) analysis to give an analytical patter after FFT. The resultant analytical pattern was compared with the result of the electron analysis simulation of the anatase titanium oxide and it was then confirmed whether the lattice constant read from the analytical pattern after FFT roughly corresponds to the anatase titanium oxide.

Evaluation 3: Measurement of Ionic Conductivity

Figure 3:
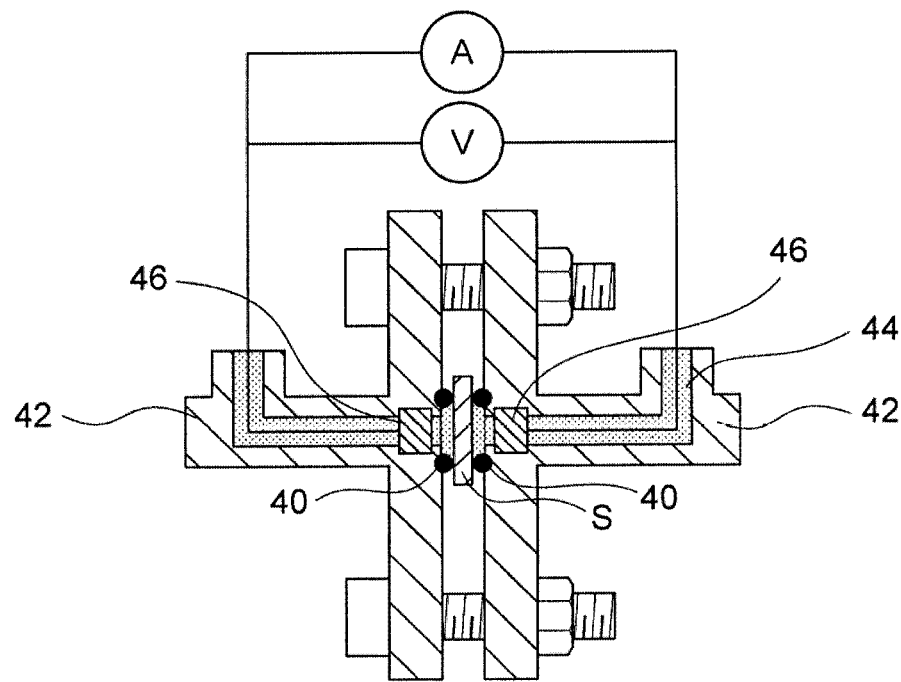
FIG. 3 is a schematic cross-sectional view illustrating an electrochemical measurement system used in Examples 1 to 6.

The conductivity of the functional layer in the electrolytic solution was measured with an electrochemical measurement system shown in FIG. 3. A composite material sample S (a porous substrate with an LDH membrane) was sandwiched between two silicone gaskets 40 having a thickness of 1 mm and assembled into a PTFE flange-type cell 42 having an inner diameter of 6 mm. Electrodes 46 made of #100 nickel wire mesh were assembled into a cylinder having a diameter of 6 mm in the cell 42, and the distance between the electrodes was 2.2 mm. The cell 42 was filled with an aqueous electrolytic solution 44 containing 6M potassium hydroxide. Using electrochemical measurement system (potentio-galvanostat frequency responsive analyzers 1287A and 1255B manufactured by Solartron), the sample was observed under the conditions of a frequency range of 1 MHz to 0.1 Hz and an applied voltage of 10 mV, and the resistance of the composite material sample S (the porous substrate with LDH membrane) was determined from the intercept across a real number axis. The resistance of the porous substrate without the LDH membrane was also measured in the same manner. The resistance of the LDH membrane was determined from the difference in resistance between the composite material sample S (the porous substrate with the LDH membrane) and the substrate. The conductivity was determined with the resistance, the thickness, and the area of the LDH membrane.

Evaluation 4: Evaluation of Alkaline Resistance

Zinc oxide was dissolved in a 6 mol/L aqueous potassium hydroxide solution to yield 6 mol/L of aqueous potassium hydroxide solution that contained zinc oxide in a concentration of 0.4 mol/L. In the next stage, 15 mL of the resultant aqueous potassium hydroxide solution was placed in a hermetic container made of Teflon™. A composite material having dimensions of 1 cm×0.6 cm was placed on the bottom of the hermetic container such that the functional layer faced upward, and the cover was closed. The composite material was stored at 70° C. or 30° C. for one week or 168 hours, or three weeks or 504 hours and then removed from the hermetic container. The composite material was dried overnight at room temperature. The microstructure of the resultant sample was observed by SEM and the crystalline structure was analyzed by XRD. In the analysis of crystalline structure by XRD, if a shift of the peak ($2\theta$) beyond 0.25° with respect to the (003) peak of LDH occurs after immersion in the aqueous potassium hydroxide solution, the crystalline structure was determined to be significantly changed.

The observation of microstructure by SEM was carried out as follows. The surface microstructure of the functional layer was observed at an acceleration voltage of 10 to 20 kV by a scanning electron microscope (SEM, JSM-6610LV, manufactured by JEOL). In addition, a cross-sectional polished surface of a functional layer (including a membrane portion composed of the LDH membrane and a composite portion composed of the LDH and the substrate) was prepared with an ionic milling system (IM 4000 manufactured by Hitachi High-Technologies Corporation) and the microstructure of the cross-sectional polished surface was then observed by SEM under the same conditions as the surface microstructure. The analysis of crystalline structure was carried out by XRD as in Evaluation 1.

Evaluation 5: Elemental Analysis (EDS)

The functional layer (the membrane portion composed of the LDH membrane and the composite portion composed of the LDH and the substrate) was polished across the thickness for observation with a cross-sectional polisher (CP). A field of cross-sectional image of the functional layer (the membrane portion composed of the LDH membrane and the composite portion composed of the LDH and the substrate) was observed with a 10,000-fold magnification with FE-SEM (ULTRA 55, manufactured by Carl Zeiss). The pure LDH membrane on the substrate surface and the LDH portion (by point analysis) inside the substrate in this cross-sectional image was subjected to elemental analysis at an accelerating voltage of 15 kV with an EDS analyzer (NORAN System SIX, manufactured by Thermo Fisher Scientific Inc.).

Evaluation 6: Determination of Density

Figure 4A:
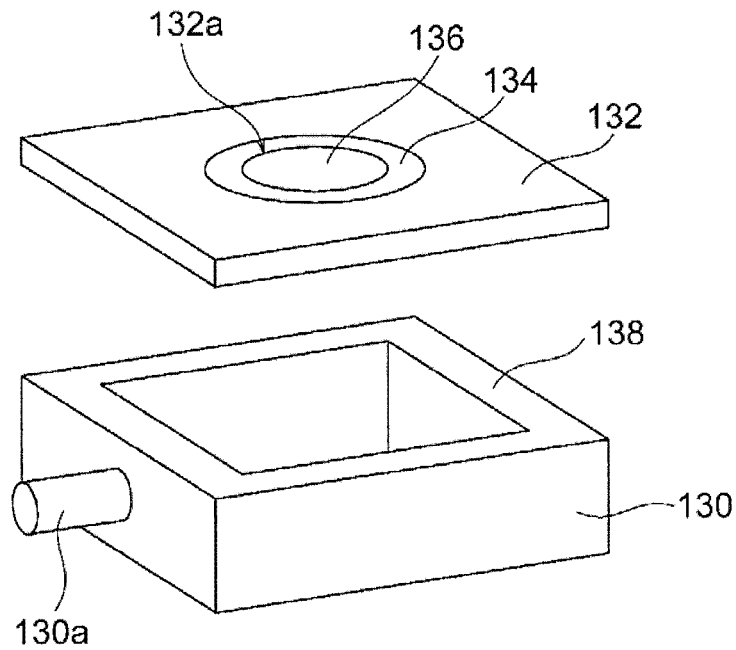
FIG. 4A is an exploded perspective view of a hermetic container used in the determination of density in Examples 1 to 6.
Figure 4B:
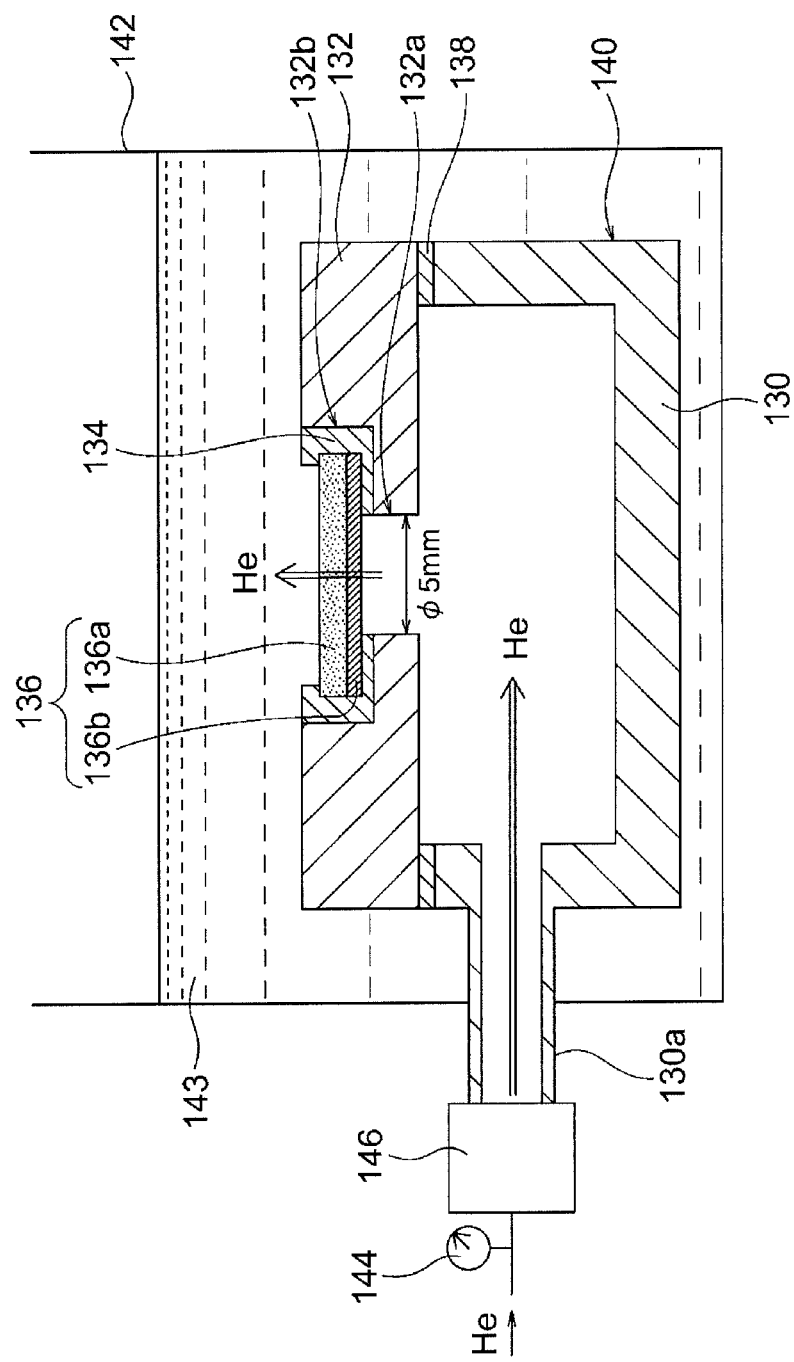
FIG. 4B is a schematic cross-sectional view of the measurement system used in the determination of density in Examples 1 to 6.

The density was determined to confirm that the functional layer had density having no air permeability. As shown in FIGS. 4A and 4B, an open acrylic container 130 and an alumina jig 132 with a shape and dimensions capable of working as a cover of the acrylic container 130 were provided. The acrylic container 130 was provided with a gas supply port 130a. The alumina jig 132 had an opening 132a having a diameter of 5 mm and a cavity 132b surrounding the opening 132a for placing the sample. An epoxy adhesive 134 was applied onto the cavity 132b of the alumina jig 132. The composite material sample 136 was placed into the cavity 132b and the function layer 136b was bonded to the alumina jig 132 in an air-tight and liquid-tight manner. The alumina jig 132 with the composite material sample 136 was then bonded to the upper end of the acrylic container 130 in an air-tight and liquid-tight manner with a silicone adhesive 138 to completely seal the open portion of the acrylic container 130. A hermetic container 140 was thereby completed for the measurement. The hermetic container 140 for the measurement was placed in a water vessel 142 and the gas supply port 130a of the acrylic container 130 was connected to a pressure gauge 144 and a flow meter 146 so that helium gas was supplied into the acrylic container 130. Water 143 was poured in the water vessel 142 to completely submerge the hermetic container 140 for the measurement. At this time, the air-tightness and liquid-tightness were sufficiently kept in the interior of the hermetic container 140 for the measurement, and the functional layer 136b of the composite material sample 136 was exposed to the internal space of the hermetic container 140 for the measurement while the porous substrate 136a of the composite material sample 136 was in contact with water in the water vessel 142. In this state, helium gas was introduced into the acrylic container 130 of the hermetic container 140 for the measurement through the gas supply port 130a. The pressure gauge 144 and the flow meter 146 were controlled such that the differential pressure between the inside and outside of the functional layer 136a reached 0.5 atm (that is, the pressure of the helium gas is 0.5 atm higher than the water pressure applied to the porous substrate 136a). Bubbling of helium gas in water from the composite material sample 136 was observed. When bubbling of helium gas was not observed, the functional layer 136b was determined to have high density with no air permeability.

Evaluation 7: Helium Permeability

Figure 5A:
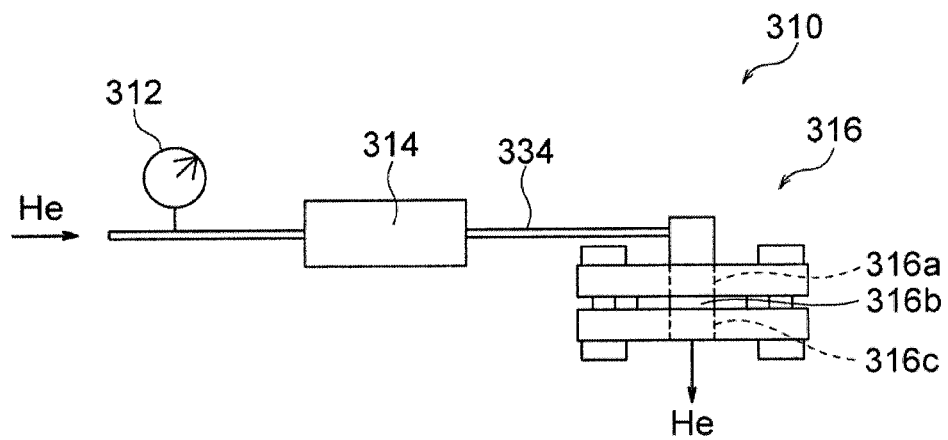
FIG. 5A is a schematic view illustrating an example system of measuring helium permeability used in Examples 1 to 6.
Figure 5B:
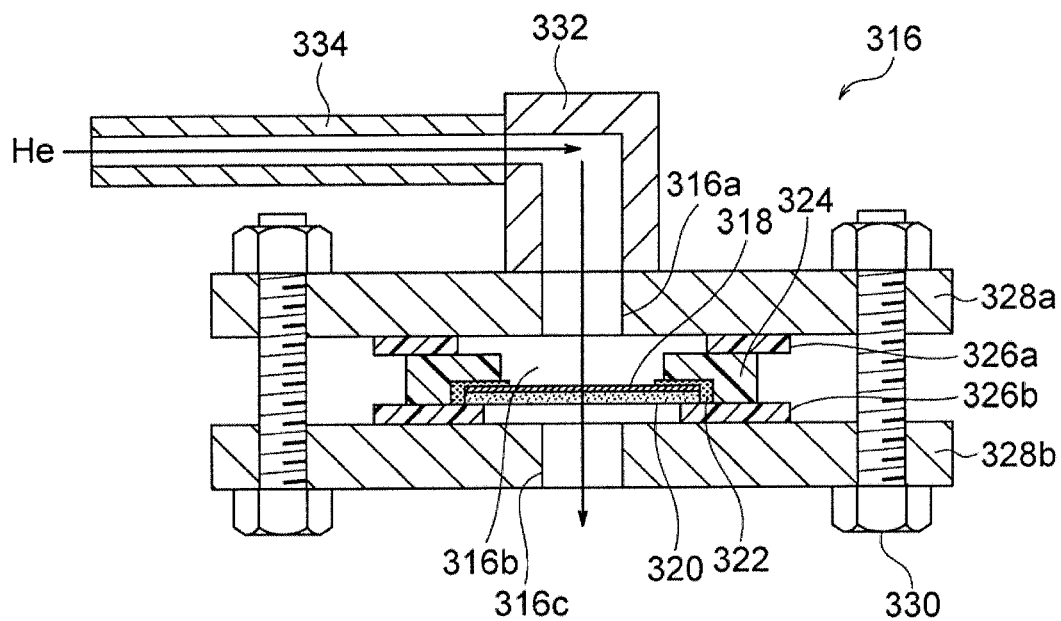
FIG. 5B is a schematic cross-sectional view of a sample holder and its peripheral configuration used in the system shown in FIG. 5A.

A helium permeation test was conducted to evaluate the density of the functional layer from the viewpoint of helium permeability. The helium permeability measurement system 310 shown in FIGS. 5A and 5B was constructed. The helium permeability measurement system 310 was configured to supply helium gas from a gas cylinder filled with helium gas to a sample holder 316 through the pressure gauge 312 and a flow meter 314 (digital flow meter), and to discharge the gas by permeating from one side to the other side of the functional layer 318 held by the sample holder 316.

The sample holder 316 had a structure including a gas supply port 316a, a sealed space 316b and a gas discharge port 316c, and was assembled as follows: An adhesive 322 was applied along the outer periphery of the functional layer 318 and bonded to a jig 324 (made of ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each having an opening and one having a flange. Thus, the sealed space 316b was partitioned by the functional layer 318, the jig 324, the sealing member 326a, and the supporting member 328a. The functional layer 318 was in the form of a composite material formed on the porous substrate 320, and was disposed such that the functional layer 318 faced the gas supply port 316a. The supporting members 328a and 328b were tightly fastened to each other with fastening means 330 with screws not to cause leakage of helium gas from portions other than the gas discharge port 316c. A gas supply pipe 34 was connected to the gas supply port 316a of the sample holder 316 assembled as above through a joint 332.

Helium gas was then supplied to the helium permeability measurement system 310 via the gas supply pipe 334, and the gas was permeated through the functional layer 318 held in the sample holder 316. A gas supply pressure and a flow rate were then monitored with a pressure gauge 312 and a flow meter 314. After permeation of helium gas for one to thirty minutes, the helium permeability was calculated. The helium permeability was calculated from the expression of $F/(P \times S)$ where F ($cm^3/min$) was the volume of permeated helium gas per unit time, P (atm) was the differential pressure applied to the functional layer when helium gas permeated through, and S ($cm^2$) was the area of the membrane through which helium gas permeates. The permeation rate F ($cm^3/min$) of helium gas was read directly from the flow meter 314. The gauge pressure read from the pressure gauge 312 was used for the differential pressure P. Helium gas was supplied such that the differential pressure P was within the range of 0.05 to 0.90 atm.

Example 1 (Comparative)

A functional layer including a LDH (not containing titania) and a composite material were prepared and evaluated by following procedures.

(1) Preparation of Porous Substrate

One hundred parts by weight of zirconia powder (TZ-8YS manufactured by Tosoh Corporation), 70 parts by weight of a dispersing medium (xylene:butanol=1:1), 11.1 parts by weight of a binder (polyvinyl butyral: BM-2 manufactured by Sekisui Chemical Co., Ltd.), 5.5 parts by weight of a plasticizer (DOP manufactured by Kurogane Kasei Co., Ltd.), and 2.9 parts by weight of a dispersant (Rheodol SP-O30 manufactured by Kao Corporation) were mixed, and the mixture was stirred to be deformed under vacuum to yield a slurry. The slurry was shaped into a sheet on a PET membrane with a tape shaping machine to yield a green sheet having the membrane thickness of 220 µm after drying. The green sheet was cut into 2.0 cm×2.0 cm×0.022 cm and fired at 1100° C. for two hours to yield a porous substrate made of zirconia.

The porosity of the porous substrate was determined to be 40% by Archimedes' method. The mean pore size of the porous substrate was also determined to be 0.2 µm. In the present invention, the mean pore size was determined by measuring the longest dimension of each pore based on the scanning electron microscopic (SEM) image of the surface of the porous substrate. The SEM image was observed at 20,000-fold magnification. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. In the measurement, a dimension measuring function in software of SEM was used.

(2) Coating of Alumina Sol on Porous Substrate

The zirconia porous substrate prepared in Procedure (1) was coated with 0.2 mL of an amorphous alumina solution (Al-ML15 manufactured by Taki Chemical Co., Ltd.) by spin coating. In the spin coating, the mixed sol was dropwise added to the substrate spinning at a rotation rate of 8,000 rpm, and the spin was then stopped after five seconds. The substrate was placed on a hot plate heated to 100° C. and dried for one minute. The substrate was then heated at 300° C. in an electric furnace. The thickness of the layer formed by this procedure was about 1 µm.

(3) Preparation of Aqueous Raw Material Solution

Nickel nitrate hexahydrate (Ni (NO$_3$)$_2$.6H$_2$O, manufactured by Kanto Chemical Co., Inc.), and urea ((NH$_2$)$_2$CO, manufactured by Sigma-Aldrich Corporation) were provided as raw materials. Nickel nitrate hexahydrate was weighed to be 0.015 mol/L and placed in a beaker, and ion-exchanged water was added thereto into a total amount of 75 mL. After stirring the solution, the urea weighed at a urea/NO$_3^-$ molar ratio of 16 was added, and further stirred to give an aqueous raw material solution.

(4) Formation of Membrane by Hydrothermal Treatment

The aqueous raw material solution prepared in Procedure (3) and the substrate prepared in Procedure (2) were placed in a Teflon™ hermetic container (autoclave, the internal volume: 100 mL, and covered with stainless steel jacket). The substrate was horizontally fixed away from the bottom of the Teflon™ hermetic container such that the solution was in contact with the two surfaces of the substrate. A LDH was then formed on the surface and the interior of the substrate by a hydrothermal treatment at a temperature of 120° C. for 24 hours. After a predetermined period, the substrate was removed from the hermetic container, washed with ion-exchanged water, and dried at 70° C. for ten hours to yield a LDH containing functional layer partly embedded in the porous substrate. The thickness of the functional layer was about 5 µm (including the thickness of the portion embedded in the porous substrate).

(5) Results of Evaluation

The resultant functional layers and composite materials were evaluated by Evaluation 1 and 3 to 7 as described below:

Evaluation 1: The resultant XRD profile determined that the functional layer contained a LDH (hydrotalcite compound) and no titania. Accordingly, the ratio $I_{TiO2}/I_{LDH}$ was zero shown in Table 1.

Evaluation 3: An ionic conductivity of the functional layer was 2.2 mS/cm shown in Table 1.

Evaluation 4: The results of SEM observation in the alkaline resistance evaluation are shown in Table 1. No change in the microstructure of the functional layer is observed even after immersion in the aqueous potassium hydroxide solution at 30° C. or 70° C. for one week. However, a change in the microstructure of the functional layer is observed after immersing in the aqueous potassium hydroxide solution at 70° C. for three weeks. Meanwhile, the XRD pattern in the alkaline resistance evaluation indicate no significant change in the crystal structure of the functional layer under all immersing conditions.

Evaluation 5: The results of EDS elemental analysis indicate that C, Al and Ni that are constituent elements of the LDH are detected in the LDH contained in the functional layer or in both the LDH membrane on the substrate surface and the LDH portion in the substrate. Al and Ni are constituent elements of the basic hydroxide layer while C corresponds to $CO_3^{2-}$ that is an anion constituting the intermediate layer of LDH.

Evaluation 6: The functional layer and the composite material were confirmed to have high density with no air permeability.

Evaluation 7: Helium permeability through the functional layer and the composite material was 0.0 cm/min·atm.

Examples 2 to 4

A functional layer and a composite material containing the LDH and titania were prepared and evaluated as in Example 1 except that coating of alumina/titania sol was performed instead of coating of the alumina sol in Example 1 (2) in the following procedure.

(Coating of Alumina/Titania Sol on Porous Substrate)

An amorphous alumina solution (Al-ML15, manufactured by Taki Chemical Co., Ltd.) and a titanium oxide sol solution (M 6, manufactured by Taki Chemical Co., Ltd.) were mixed with Ti/Al molar ratios of 1 (Example 2), 2 (Example 3) or 5 (Example 4) to prepare mixed sol samples. The porous substrate made of zirconia prepared in Procedure (1) of Example 1 was coated with 0.2 mL of the mixed sol by spin coating. In the spin coating, the mixed sol was dropwise added to the substrate spinning at a rotation rate of 8,000 rpm, and the spinning was then stopped after five seconds. The substrate was placed on a hot plate heated to 100° C. and dried for one minute. The substrate was then heated at 300° C. in an electric furnace. The thickness of the layer formed by this procedure was about 1 µm.

(Results of Evaluation)

Evaluations 1 to 7 were performed on the resultant functional layer or composite material. The results were as follows.

Figure 6:
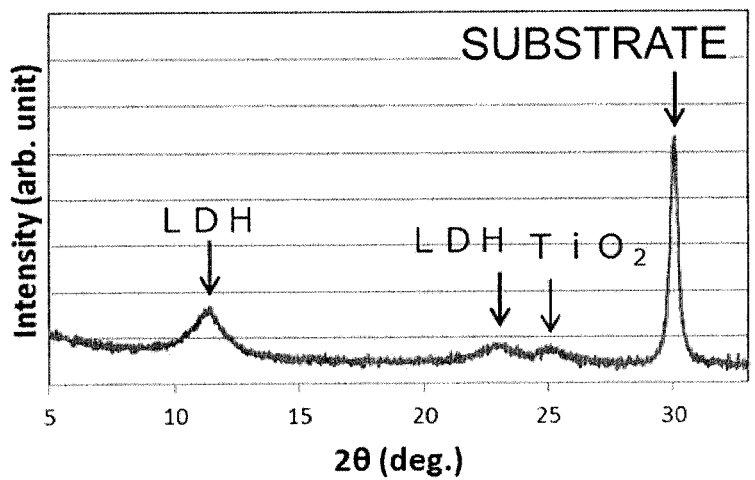
FIG. 6 is a graph showing an X-ray diffraction pattern of a functional layer produced in Example 3.

Evaluation 1: From the resulting XRD profile, the functional layers in Examples 2 to 4 were confirmed to contain the LDH (hydrotalcite compound) and titania. FIG. 6 illustrates X-ray diffraction patter of the functional layer produced in Example 3. The ratio of peak intensity, $I_{TiO2}/I_{LDH}$, was 0.1 to 0.4 as shown in Table 1.

Figure 7:
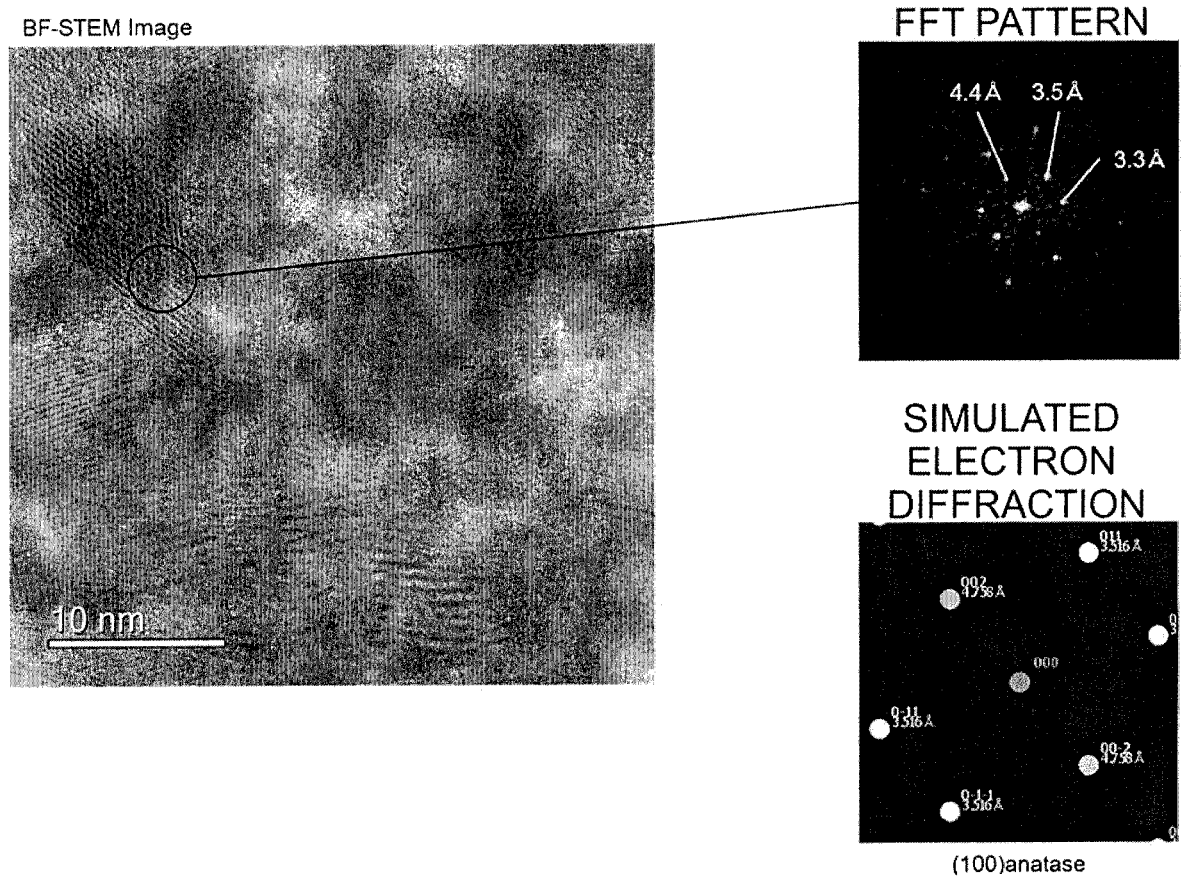
FIG. 7 is a BF-STEM image, an analytical pattern after FFT, and a result of an electron analysis simulation of anatase titanium oxide for a functional layer produced in Example 3.

Evaluation 2: Since lattice constants read from the analytical patterns after FFT in the functional layers of Examples 2 to 4 generally correspond to the simulated electron analysis pattern of anatase titanium oxide, the functional layers were confirmed to contain anatase titania. FIG. 7 illustrates the BF-STEM image and the analytic pattern after FFT of the functional layer in Example 3.

Evaluation 3: An ionic conductivity of the functional layers in Examples 2 to 4 was 2.0 to 2.2 mS/cm equivalent to that in Examples 1 and 5, which were comparative examples.

Figure 8:
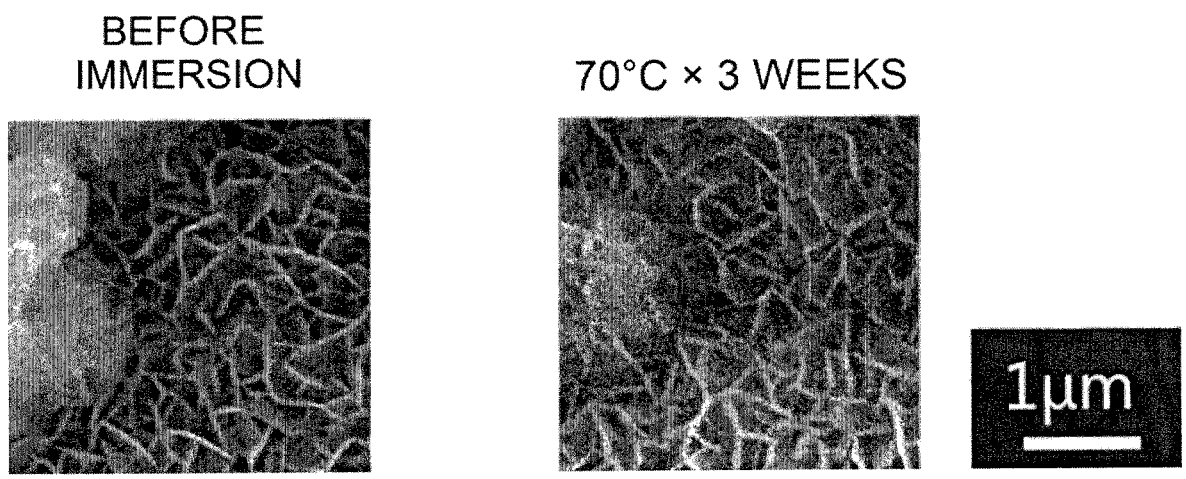
FIG. 8 illustrates SEM images showing the surface microstructures of the functional layer produced in Example 3 before immersion and after immersion at 70° C. for three weeks in an aqueous potassium hydroxide solution.
Figure 9:
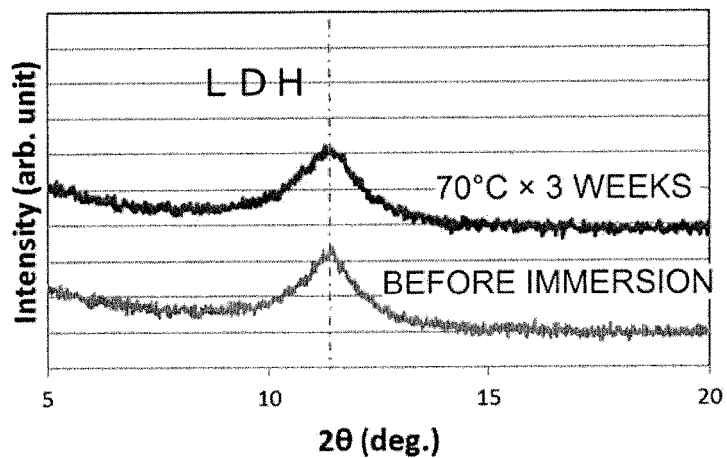
FIG. 9 is a graph showing X-ray diffraction patterns of the functional layer produced in Example 3 before immersion and after immersion at 70° C. for three weeks in an aqueous potassium hydroxide solution.

Evaluation 4: Table 1 shows the results of SEM observation in the alkaline resistance evaluation. FIG. 8 illustrates SEM images showing the surface microstructure of the functional layer in Example 3 before immersion and after immersion at 70° C. for three weeks in the aqueous potassium hydroxide solution. As shown in Table 1 and FIG. 8, no change in the microstructure of the functional layer is observed even after immersion in the aqueous potassium hydroxide solution at 70° C. for three weeks. Meanwhile, XRD patterns in the alkaline resistance evaluation are shown in Table 1. FIG. 9 illustrates the X-ray diffraction patterns of the functional layer in Example 3 before immersion and after immersion at 70° C. for three weeks in the aqueous potassium hydroxide solution. As shown in Table 1 and FIG. 9, no significant change in the crystalline structure is observed even after immersion in the aqueous potassium hydroxide solution at 70° C. for three weeks in all Examples 2 to 4. In summary, Examples 2 to 4 relating to the functional layers containing the LDH and titania are superior to Example 1 described above and Example 5 described later relating to the functional layer containing the LDH and no titania in alkaline resistance. In fact, the position of the (003) peak of LDH contained in the functional layer of Examples 2 to 4 exhibits no significant change in all the functional layers before immersion, after immersion for one week and for three weeks in the aqueous potassium hydroxide solution as in Table 1.

Evaluation 5: The results of EDS elemental analysis indicate that C, Al, Ti and Ni that are constituent elements of the LDH were detected in the LDH contained in the functional layer or in both the LDH membrane on the substrate surface and the LDH portion in the substrate. Al, Ni and optional Ti are constituent elements of the basic hydroxide layer while C is derived from $CO_3^{2-}$, which is an anion constituting the intermediate layer of LDH. It should be understood that Ti is derived from titania.

Evaluation 6: The functional layer and the composite material were confirmed to have high density with no air permeability.

Evaluation 7: Helium permeability of the functional layer and the composite material was 0.0 cm/min·atm.

Example 5 (Comparative)

A functional layer including Mg/Al-containing LDH and a composite material were prepared and evaluated by following procedures.

(1) Preparation of Porous Substrate

One hundred parts by weight of alumina powder (AES-12 manufactured by Sumitomo Chemical Co., Ltd.), 70 parts by weight of a dispersing medium (xylene:butanol=1:1), 11.1 parts by weight of a binder (polyvinyl butyral: BM-2 manufactured by Sekisui Chemical Co., Ltd.), 5.5 parts by weight of a plasticizer (DOP manufactured by Kurogane Kasei Co., Ltd.), and 2.9 parts by weight of a dispersant (Rheodol SP-030 manufactured by Kao Corporation) were mixed, and the mixture was stirred to be deformed under vacuum to yield a slurry. The slurry was shaped into a sheet on a PET membrane with a tape shaping machine to yield a green sheet having the membrane thickness of 220 μm after drying. The green sheet was cut into dimensions of 2.0 cm×2.0 cm×0.022 cm and fired at 1300° C. for two hours to yield a porous substrate made of alumina. The porosity of the porous substrate was determined to be 40% by Archimedes' method. The mean pore size of the porous substrate was also determined as in Example 1 to be 0.3 μm.

(2) Spin Coating and Sulfonation of Polystyrene

A polystyrene substrate (0.6 g) was dissolved in a xylene solution (10 mL) to prepare a spin coating solution having a polystyrene concentration of 0.06 g/mL. The resulting spin coat solution (0.1 mL) was dropwise applied and spin-coated on the porous substrate at a rotation rate of 8,000 rpm. The spin coating was continued for 200 seconds including the dropwise application and drying. The porous substrate coated with the spin coating solution was sulfonated in 95% sulfuric acid at 25° C. for four days.

(3) Preparation of Aqueous Raw Material Solution

Magnesium nitrate hexahydrate ($Mg(NO_3)_2 \cdot 6H_2O$, manufactured by Kanto Chemical CO., Inc.), aluminum nitrate nonahydrate ($Al(NO_3)_3 \cdot 9H_2O$, manufactured by Kanto Chemical CO., Inc.), and urea (($NH_2)_2CO$, manufactured by Sigma-Aldrich Corporation) were provided as raw materials. Magnesium nitrate hexahydrate and aluminum nitrate nonahydrate were weighed such that a cation ratio ($Mg^{2+}/Al^{3+}$) was 2 and a molar concentration of the total metal ions ($Mg^{2+}+Al^{3+}$) was 0.320 mol/L to be placed in a beaker. Ion-exchanged water was added thereto into a total amount of 70 mL. After stirring the solution, the urea weighed at a urea/$NO_3^-$ molar ratio of 4 was added, and further stirred to yield an aqueous raw material solution.

(4) Formation of Membrane by Hydrothermal Treatment

The aqueous raw material solution prepared in Procedure (3) and the substrate prepared in Procedure (2) were placed in a Teflon™ hermetic container (autoclave, the internal volume: 100 mL, and covered with stainless steel jacket). The substrate was horizontally fixed away from the bottom of Teflon™ hermetic container such that the solution was in contact with the two surfaces of the substrate. A LDH membrane was then formed on the surface of the substrate by a hydrothermal treatment at a temperature of 70° C. for 168 hours (or seven days). After a predetermined period, the substrate was removed from the hermetic container, washed with ion-exchanged water, and dried at 70° C. for ten hours to give a LDH containing functional layer partly embedded in the porous substrate. The thickness of the functional layer was about 3 μm (including the thickness of the portion embedded in the porous substrate).

(5) Results of Evaluation

Evaluations 1 and 3 to 7 were performed on the resultant functional layer or composite material. The results were as follows.

Evaluation 1: The resulting XRD profile found that the functional layer contained a LDH (hydrotalcite compound) and no titania.

Evaluation 3: An ionic conductivity of the functional layer was 2.0 mS/cm.

Evaluation 4: Table 1 illustrates the results of SEM observation in the alkaline resistance evaluation. In Table 1, a change in the microstructure of the functional layer was observed even after immersion in the aqueous potassium hydroxide solution at 30° C. lower than 70° C. in Examples 1 to 4 for one week (that is, even under milder alkaline condition than in Examples 1 to 4). In addition, Table 1 illustrates the X-ray diffraction results of the functional layer before immersion and after immersion at 30° C. for one week in the aqueous potassium hydroxide solution. As in Table 1, a change in the crystalline structure was observed even after immersion in the aqueous potassium hydroxide solution at 30° C. lower than 70° C. in Examples 1 to 4 for one week (that is, even under milder alkaline condition than in Examples 1 to 4). In particular, a (003) peak of the LDH contained in the functional layer was shifted from 2θ=11.70 before immersion to 2θ=11.44 after immersion for one week in the aqueous potassium hydroxide solution. The shift of the (003) peak suggests that Al contained in the LDH is eluted into the aqueous potassium hydroxide solution to deteriorate the LDH. These results indicate that the functional layer of Example 5 is inferior in alkaline resistance to the functional layers of Examples 1 to 4, or the functional layers of Examples 1 to 4 (especially, Examples 2 to 4 of the present embodiment) are superior in alkaline resistance to the functional layer of Example 5 of the comparative embodiment.

Evaluation 5: The results of EDS elemental analysis indicate that C, Mg and Al that are constituent elements of the LDH are detected in the LDH contained in the functional layer or in both the LDH membrane on the substrate surface and the LDH portion in the substrate.

Mg and Al are constituent elements of the basic hydroxide layer while C corresponds to $CO_3^{2-}$ that is an anion constituting the intermediate layer of LDH.

Evaluation 6: The functional layer and the composite material were confirmed to have high density with no air permeability.

Evaluation 7: Helium permeability through the functional layer and the composite material was 0.0 cm/min·atm.

period, the substrate was removed from the hermetic container, washed with ion-exchanged water, and dried at 70° C. for ten hours to give a LDH containing functional layer embedded into the porous substrate.

(5) Evaluation Results

Evaluations 1 to 7 were performed on the resultant functional layer or the composite material. The results were as follows.

TABLE 1

| | Coating conditions of alumina/titania sol Molar ratio Ti/Al | Evaluation after formation of LDH membrane | | Results of ion conductivity measurement Ionic conductivity (mS/cm) | Evaluation of alkaline resistance | | | | Results of XRD (003) peak shift** beyond 0.25° between before and after immersion |
|---|---|---|---|---|---|---|---|---|---|
| | | Results of XRD Presence of $TiO_2$ in functional layer | $I_{TiO2}/I_{LDH}$ | | Immersing conditions | | Results of SEM observation | | |
| | | | | | Temp. (° C.) | Time (weeks) | Change in surface microstructure | Change in cross-sectional microstructure | |
| Example 1* | 0 | Not found | 0 | 2.2 | 30 | 1 | Not found | Not found | Not found |
| | | | | | 70 | 1 | Not found | Not found | Not found |
| | | | | | | 3 | Found | Found | Not found |
| Example 2 | 1 | Found | 0.1 | 2.2 | 70 | 1 | Not found | Not found | Not found |
| | | | | | | 3 | Not found | Not found | Not found |
| Example 3 | 2 | | 0.2 | 2.1 | 70 | 3 | Not found | Not found | Not found |
| Example 4 | 5 | | 0.4 | 2.0 | 70 | 3 | Not found | Not found | Not found |
| Example 5* | | Mg/Al-containing LDH | | 2.0 | 30 | 1 | Found | Found | Found |

*comparative example
**[(003) peak (2θ) before immersion] − [(003) peak (2θ) after immersion] > 0.25°

Example 6

A functional layer containing LDH and titania, and a composite material were prepared with a polymeric porous substrate and evaluated by following procedures.

(1) Preparation of Polymeric Porous Substrate

A commercially available polypropylene porous substrate having a porosity of 50%, a mean pore size of 0.1 μm and a thickness of 20 μm was cut out into a size of 2.0 cm×2.0 cm.

(2) Coating of Alumina/Titania Sol on Polymeric Porous Substrate

An amorphous alumina solution (Al-ML15, manufactured by Taki Chemical Co., Ltd.) and a titanium oxide sol solution (M6, manufactured by Taki Chemical Co., Ltd.) were mixed at Ti/Al molar ratio of 2 to yield a mixed sol. The mixed sol was applied onto the substrate prepared in Procedure (1) by dip coating. In dip coating, the substrate was immersed in 100 mL of the mixed sol, pulled up vertically and dried in a dryer at 90° C. for five minutes.

(3) Preparation of Aqueous Raw Material Solution

An aqueous raw material solution was prepared as procedure (3) in Example 1.

(4) Formation of Membrane by Hydrothermal Treatment

The aqueous raw material solution and the dip-coated substrate were placed in a Teflon™ hermetic container (autoclave, the internal volume: 100 mL, and covered with stainless steel jacket). The substrate was horizontally fixed away from the bottom of a Teflon™ hermetic container such that the solution was in contact with the two surfaces of the substrate. The LDH was then formed on the surface of the substrate and in the substrate by a hydrothermal treatment at a temperature of 120° C. for 24 hours. After a predetermined Evaluation 1: The resulting XRD profile found that the functional layer contained a LDH (hydrotalcite compound) and titania.

Evaluation 2: Since lattice constant read from the analytic patterns after FFT in the functional layers generally correspond to the electron diffraction simulation result of anatase titanium oxide, the functional layers were confirmed to contain anatase titania.

Evaluation 3: A conductivity of the functional layers was 2.0 mS/cm equivalent to that in Examples 1 to 5 described above.

Evaluation 4: No change in the microstructure of the functional layers was observed even after immersion in the aqueous potassium hydroxide solution at 70° C. for 3 weeks or 7 weeks.

Evaluation 5: The results of EDS elemental analysis indicate that C, Al, Ti and Ni that are constituent elements of the LDH are detected in the LDH contained in the functional layer or in both the LDH membrane on the substrate surface and the LDH portion in the substrate. Al, Ni and optional Ti are constituent elements of the basic hydroxide layer while C corresponds to $CO_3^{2-}$ that is an anion constituting the intermediate layer of LDH.

Evaluation 6: The functional layer and the composite material were confirmed to have high density with no air permeability.

Evaluation 7: Helium permeability through the functional layer and the composite material was 0.0 cm/min·atm.

The observation of the microstructure is performed for the resultant functional layer or composite material as follows.

(Observation of the Microstructure)

Figure 10:
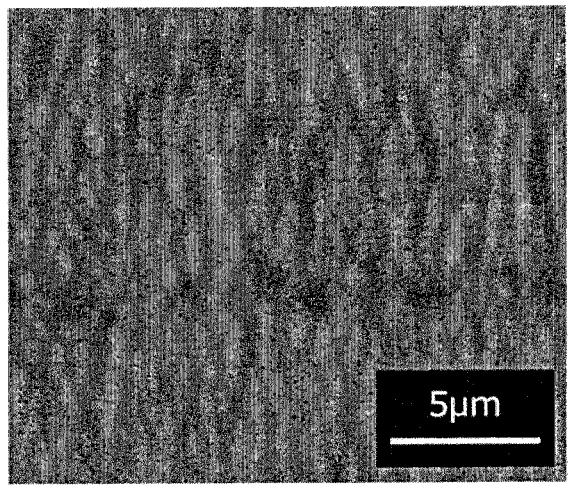
FIG. 10 is an SEM image showing the surface microstructure of the functional layer and the composite material produced in Example 6.

The surface microstructure of the functional layer was observed at an acceleration voltage of 10 to 20 kV with a scanning electron microscope (SEM, JSM-6610LV, manufactured by JEOL). In addition, a cross-sectional polished surface of a functional layer (including a membrane portion composed of the LDH membrane and a composite portion composed of the LDH and the substrate) was prepared with an ionic milling system (IM 4000 manufactured by Hitachi High-Technologies Corporation) and the microstructure of the cross-sectional polished surface was then observed with SEM under the same conditions as the surface microstructure. FIG. 10 illustrates a SEM image of the cross-sectional microstructure of the functional layer or composite material. As observed in FIG. 10, the functional layer was embedded over the entire region in the thickness direction of the porous substrate, or the pores of the porous substrate were completely filled with the LDH.

What is claimed is:

1. A functional layer comprising a layered double hydroxide, wherein the functional layer further comprises titania, and wherein the layered double hydroxide is composed of a plurality of basic hydroxide layers comprising Ni, Al, Ti and OH groups or comprising Ni, Al and OH groups; and intermediate layers composed of anions and $H_2O$, each intermediate layer being interposed between two adjacent basic hydroxide layers.

2. The functional layer according to claim 1, wherein a crystalline structure of the titania is of an anatase type or a rutile type.

3. The functional layer according to claim 2, wherein the ratio $I_{TiO2}/I_{LDH}$ of the peak intensity $I_{TiO2}$ derived from the titania to the peak intensity $I_{LDH}$ derived from the (003) plane of the layered double hydroxide is 0.1 or more when the surface of the functional layer is measured by X-ray diffractometry, and wherein the $I_{TiO2}$ is the intensity of the strongest peak derived from the (101) plane in the case that the titania is of an anatase type or the $I_{TiO2}$ is the intensity of the strongest peak derived from the (110) plane in the case that the titania is of a rutile type.

4. The functional layer according to claim 3, wherein the ratio $I_{TiO2}/I_{LDH}$ is 10 or less.

5. The functional layer according to claim 3, wherein the ratio $I_{TiO2}/I_{LDH}$ is 1.0 or less.

6. The functional layer according to claim 1, wherein the functional layer has a hydroxide ion conductivity.

7. The functional layer according to claim 1, wherein the functional layer has an ion conductivity of 0.1 mS/cm or more.

8. The functional layer according to claim 1, wherein the layered double hydroxide undergoes no change in surface microstructure and crystalline structure when immersed in a 6 mol/L aqueous potassium hydroxide solution containing zinc oxide in a concentration of 0.4 mol/L at 70° C. for three weeks.

9. The functional layer according to claim 1, wherein the basic hydroxide layers are composed of Ni, Al, Ti and OH groups or composed of Ni, Al, Ti, OH groups and incidental impurities.

10. The functional layer according to claim 1, wherein the functional layer has a helium permeability per unit area of 10 cm/min·atm or less.

11. The functional layer according to claim 1, wherein the functional layer has a thickness of 100 μm or less.

12. A composite material comprising:
   a porous substrate; and
   a functional layer according to claim 1 provided on the porous substrate and/or embedded in the porous substrate.

13. The composite material according to claim 12, wherein the porous substrate is composed of at least one selected from the group consisting of ceramic materials, metallic materials, and polymeric materials.

14. The composite material according to claim 13, wherein the porous substrate is composed of a polymeric material, and the functional layer is embedded over the entire region in the thickness direction of the porous substrate.

15. The composite material according to claim 12, wherein the composite material has a helium permeability per unit area of 10 cm/min·atm or less.

16. A battery comprising, as a separator, the functional layer according to claim 1.

17. A battery comprising, as a separator, the composite material according to claim 12.

* * * * *